United States Patent [19]

Yonezawa

[11] Patent Number: 5,113,899
[45] Date of Patent: May 19, 1992

[54] CHECK VALVE WITH VALVE OPENING DEVICE

[75] Inventor: Keitaro Yonezawa, Kobe, Japan

[73] Assignee: Kabushiki Kaisha Kosmek, Kobe, Japan

[21] Appl. No.: 644,784

[22] Filed: Jan. 23, 1991

[30] Foreign Application Priority Data

Jan. 31, 1990 [JP] Japan .................. 2-23066

[51] Int. Cl.⁵ .................. F16K 15/18; F16K 17/28
[52] U.S. Cl. .................. 137/461; 137/522; 251/297
[58] Field of Search .............. 137/461, 460, 522, 523, 137/901; 251/297

[56] References Cited

U.S. PATENT DOCUMENTS 4,131,126 12/1978 Chromik .................. 251/297 X
5,036,666 8/1991 Vasselet .................. 137/461 X

FOREIGN PATENT DOCUMENTS

3817034 5/1988 Fed. Rep. of Germany .
63-24304 7/1988 Japan .
565962 9/1973 Switzerland .
1211474 3/1968 United Kingdom .
1336039 12/1971 United Kingdom .
2118689 4/1983 United Kingdom .

*Primary Examiner*—John Rivell
*Attorney, Agent, or Firm*—Lowe, Price, LeBlanc & Becker

[57] ABSTRACT

In a check valve with a valve opening device, a check valve member (32) inserted into a check valve chamber (21) formed in a valve box (20) is resiliently urged for valve closing by means of a check spring (33) as well as the check valve member (32) is manipulated for valve opening through a manipulation lever (45), an actuator shaft (43) and a valve opening member (36) in order. The valve opening member (36) is adapted to be held at a valve opening position (F) by means of a valve opened state holding means (38). The valve opened state holding means (38) is arranged in both the valve opening member (36) and the valve box (20). A manipulation lever return spring (46) is disposed in a manipulation force transmitting system from the manipulation lever (45) to the valve box (20) through the actuator shaft (43).

5 Claims, 6 Drawing Sheets

PRIOR ART
FIG.12

# CHECK VALVE WITH VALVE OPENING DEVICE

BACKGROUND OF THE INVENTION

1. Field of the Invention

The present invention relates to a check valve with an valve opening device for use in supplying and discharging a pressurized oil with respect to a hydraulic cylinder, for example in a hydraulic clamp apparatus adapted to secure a work to a machine tool.

2. Prior Art

As such a check valve with a valve opening device has been known the one disclosed in the Japanese Utility Model Publication No. 1988 - 24304 previously proposed by the inventor of the present invention. This check valve has the following basic construction as illustrated in FIGS. 11 and 12.

An inlet port 122 is opened in one end surface of a check valve chamber 121 within a valve box 120 and an outlet port 128 is opened in another surface thereof besides the inlet port 122. A check valve member 132 is inserted into the check valve chamber 121 with being resiliently urged by means of a check spring 133 for valve closing to a check valve seat 134 formed in the peripheral wall of the inlet port 122. A valve opening member insertion port 123 is so formed as to face the inlet port 122 of the check valve chamber 121, and a valve opening member 136 is slidably and oil-tightly inserted into the valve opening member insertion port 123. Herein, the valve opening member 136 is adapted to be changed over between a valve opening position F where the check valve member 132 is moved for valve opening by advancing the valve opening member 136 toward the check valve chamber 121 and a valve opening cancellation position E where the valve opening member 136 is retreated outside the inlet port 122 from the check valve chamber 121. The right end portion of the valve opening member 136 is so disposed as to face the check valve member 132 from the side of the inlet port 122, and the left end portion thereof is so disposed as to face an actuation portion 144 of an actuator shaft 143. The actuator shaft 143 is adapted to be turned by means of a manipulation lever 145 in the same direction. The manipulation lever 145 is adapted to be changed over between a valve opening posture B (refer to a figure depicted by the alternate long and short dash line) where the valve opening member 136 is changed over to the valve opening position F on the right side through the actuator shaft 143 and a valve opening cancellation posture A (refer to a figure depicted by the alternate long and two short dashes line) where the valve opening member 136 is allowed to be changed over from the valve opening position on the right side to the valve opening cancellation position E on the left side.

In the portion from the manipulation lever 145 to the valve box 120 through the actuator shaft 143 and the valve opening member 136 there is provided a valve opened state holding means 138 for holding the valve opening member 136 at the valve opening position on the right side. And, the valve opening member 136 is adapted to be automatically returned from the valve opening position on the right side to the valve opening cancellation position E on the left side when it is pushed toward the actuator shaft 143 from the condition in which the valve opening member 136 is held at the valve opening position on the right side by means of the valve opened state holding means 138, by supplying a pressurized oil to the inlet port 122.

Figure 11:
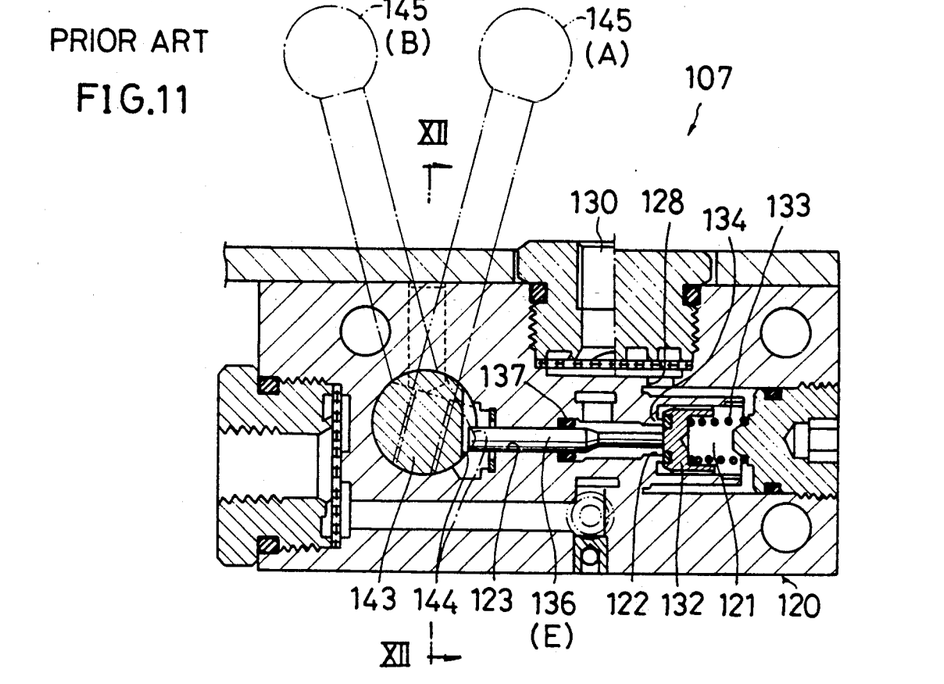
FIG. 11 is a view corresponding to FIG. 3.
Figure 12:
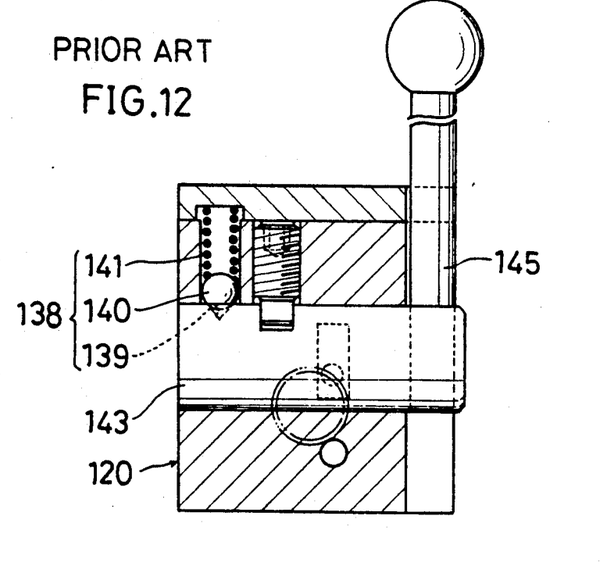
FIG. 12 is a sectional view taken along the XII—XII directed line in FIG. 11.

In the aforementioned basic construction, as illustrated in FIGS. 11 and 12, conventionally the valve opened state holding means 138 is provided in both the valve box 120 and the actuator shaft 143, and the actuator shaft 143 is so disposed that the axis thereof is eccentric to the axis of the valve opening member 136.

When the check valve member 132 is returned from the valve opened state to the illustrated valve opening cancellation state, the valve opening member 136 is changed over from the valve opening position to the illustrated valve opening cancellation position E by means of a hydraulic pressure applied to the valve opening member 136 from the inlet port 122 at the time of pressure supply, so that the actuation portion 144 of the actuator shaft 143 is pushed through the valve opening member 136. Thereby, the actuator shaft 143 is turned by means of a turning moment produced by the aforementioned eccentricity and the manipulation lever 145 is automatically returned from the valve opening posture B to the valve opening cancellation posture A.

There are, however, the following problems associated with the aforementioned prior art.

Since there are four resistances of a sliding resistance at a sealing portion 137 of the valve opening member 136, a sliding resistance at a contact portion between the actuation portion 144 of the actuator shaft 143 and the valve opening member 136, a lock cancellation resistance at the valve opened state holding means 138 and a turning resistance at the actuator shaft 143 as a resistance subjected to the valve opening member 136 when the valve opening member 136 is changed over from the valve opening position on the right side to the valve opening cancellation position E on the left side by means of the hydraulic pressure in the inlet port 122, the resistance against the valve opening member 136 becomes large. Accordingly, a check valve 107 with the valve opening device is not suitable for a low pressure application.

Then, since the turning resistance at the actuator shaft 143 irregularly changes due to intrusion of foreign substances, generation of rusts, lack of lubrication and so on, the pressure in the inlet port 122 becomes unstable when the valve opening member 136 is changed over from the valve opening position to the valve opening cancellation position E.

Further, accompanied with the unstable changeover of the aforementioned valve opening member 136, it is apprehended that the manipulation lever 145 is suddenly changed over from the valve opening posture B to the valve opening cancellation posture A.

SUMMARY OF THE INVENTION

The present invention is directed to solving the abovementioned respective problems.

It is an object of the present invention to decrease a resistance against a valve opening member at the time of changeover thereof for valve opening cancellation.

It is another object of the present invention to make a pressure in an inlet port stable at the time of changeover of the valve opening member for valve opening cancellation.

It is still another object of the present invention to prevent a sudden changeover of a manipulation lever.

For accomplishing the aforementioned objects, the present invention improves the aforementioned basic construction as follows.

The valve opened state holding means is arranged in both the valve opening member and valve box. A manipulation lever return spring is arranged in a manipulation force transmission system from the manipulation lever to the valve box through the actuator shaft. The manipulation lever return spring allows the manipulation lever to be changed over from the valve opening cancellation posture A to the valve opening posture B and is adapted to automatically return the manipulation lever from the valve opening posture B to the valve opening cancellation posture A.

Incidentally, the valve opened state holding means may be arranged separately from a sealing member for the valve opening member or may be integrated with the sealing member as one piece.

Further, the manipulation lever return spring may be arranged between the manipulation lever and the valve box or may be arranged between the actuator shaft and the valve box.

According to the present invention, the following advantages can be provided.

When the valve opening member is changed over from the valve opening position to the valve opening cancellation position by means of the pressure in the inlet port, the changeover resistance acting on the valve opening member can be only two resistance, namely the sliding resistance at the sealing portion of the valve opening member and the lock cancellation resistance at the valve opened state holding means. Therefore, the resistance acting on the valve opening member becomes smaller, and it becomes possible to employ the check valve with the valve opening device for a wide utilization from a low pressure to a high pressure.

Since the sealing portion of the aforementioned valve opening member is sufficiently lubricated with a pressurized oil so that rusts are hardly produced thereon and also intrusions of foreign substances are hardly caused, the sliding resistance becomes stable. Therefore, when the valve opening member is changed over from the valve opening position to the valve opening cancellation position, also the pressure in the inlet port is stabilized.

Further, since the manipulation lever is automatically returned by means of the resilient force of the return spring from the valve opening posture to the valve opening cancellation posture before the valve opening member is changed over from the valve opening position to the valve opening cancellation position, it becomes possible to prevent a sudden changeover.

Incidentally, according to the present invention, since it is unnecessary to dispose the actuator shaft and the valve opening member in such a condition that the axes thereof are eccentric to each other like the prior art, advantageously there is a high degree of design freedom.

BRIEF DESCRIPTION OF THE DRAWINGS

The above and other objects, advantages and features of the present invention will become apparent when considered with the following detailed description of preferred embodiments with reference to the accompanying drawings, in which:

FIGS. 1 through 10 show embodiments of the present invention;

FIGS. 1 through 4 show a first embodiment thereof;

FIG. 1 is a schematic view explaining the operation thereof.

FIG. 5 and 6 show a second embodiment thereof;

FIGS. 8 through 10 show a fourth embodiment thereof;

FIGS. 11 and 12 show a conventional embodiment;

DESCRIPTION OF THE PREFERRED EMBODIMENTS

Embodiments of the present invention will be explained with reference to the accompanying drawings hereinafter.

First Embodiment

FIGS. 1 through 4 show a first embodiment.

Figure 2:
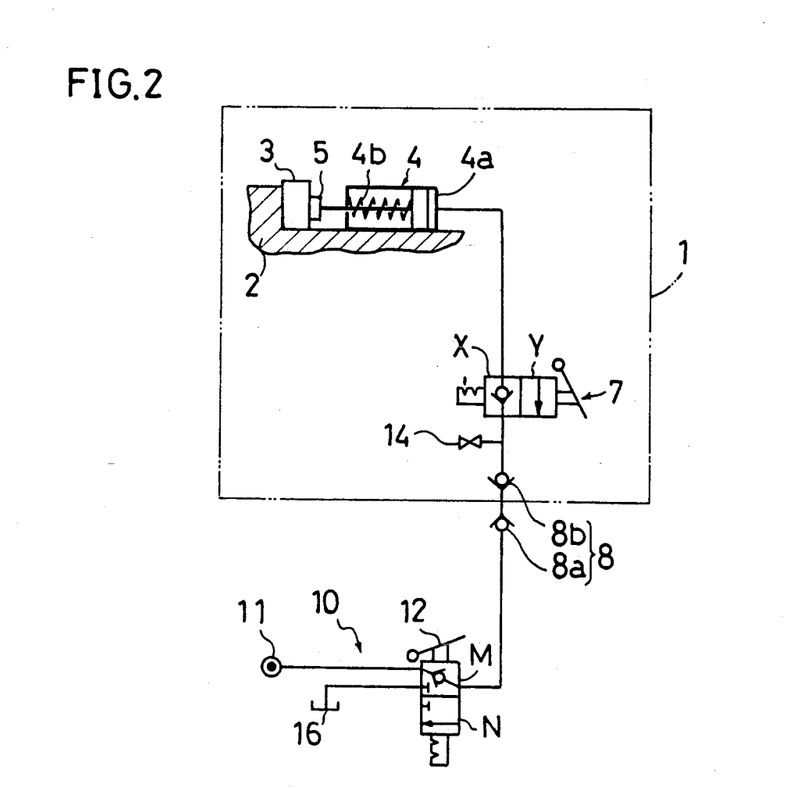
FIG. 2 is a system diagram of a hydraulic apparatus employing a check valve with a valve opening device.

A system diagram of FIG. 2 shows a hydraulic apparatus to which the present invention is applied and which is adapted to press and secure a work 3 onto a fixing frame 2 of a work pallet 1 to be brought into a machining center, by means of a clamping member 5 of a hydraulic clamp 4. The hydraulic clamp 4 comprises a hydraulic cylinder of the single acting spring return type and has a clamp actuating oil chamber 4a communicated with a hydraulic pressure supply and discharge device 10 disposed outside the work pallet 1, through a check valve 7 with a valve opening device and a quick coupling 8 with check valves on its opposite sides in order.

When the work 3 is clamped, a first coupling 8a of the quick coupling 8 is connected to a second coupling 8b thereof, the check valve 7 is changed over to a valve opening cancellation condition X providing a checked state as well as a pressurized oil supply and discharge changeover valve 12 of the hydraulic pressure device 10 is changed over to a pressure supply condition M. Thereupon, the pressurized oil in a hydraulic pressure source 11 is supplied to the clamp actuating oil chamber 4a of the hydraulic clamp 4 through the changeover valve 12, the quick coupling 8 and the check valve 7 in order, so that the work 3 is pressed and secured by means of the clamping member 5.

Under this clamped condition, the work pallet 1 is brought to the machining center after the quick coupling 8 has been disconnected so as to apply a machining to the work 3. After completion of the machining for the work 3, firstly the work pallet 1 is brought out of the machining center and then the clamped condition of the work 3 is cancelled.

When the machining completed work 3 is unclamped, firstly a pressure removal between the check valve 7 and the second coupling 8b of the quick coupling 8 is performed by manipulating a pressure release valve 14 for valve opening and then the quick coupling 8 is connected thereto. Subsequently, the check valve 7 is changed over to the valve opening condition Y providing a checking cancellation state as well as the changeover valve 12 is changed over to a pressure discharging condition N. Thereupon, the pressurized oil within the clamp actuating oil chamber 4a of the hydraulic clamp 4 is returned by means of a resilient force of a return spring 4b to an oil tank 16 through the route comprising the check valve 7, the quick coupling 8 and the changeover valve 12, so that the machining completed work 3 is taken out outside the work pallet 1 after cancellation of the clamped condition.

Then, when a new work 3 is clamped, the check valve 7 is changed over to the valve opening cancellation condition X as mentioned above as well as the changeover valve 12 of the hydraulic device 10 is changed over to the pressure supply condition M, so that the pressurized oil is supplied to the hydraulic clamp 4.

A concrete construction of the aforementioned check valve 7 with the valve opening device will be explained with reference to FIGS. 3 and 4 and a schematic view of FIG. 1.

Figure 3:
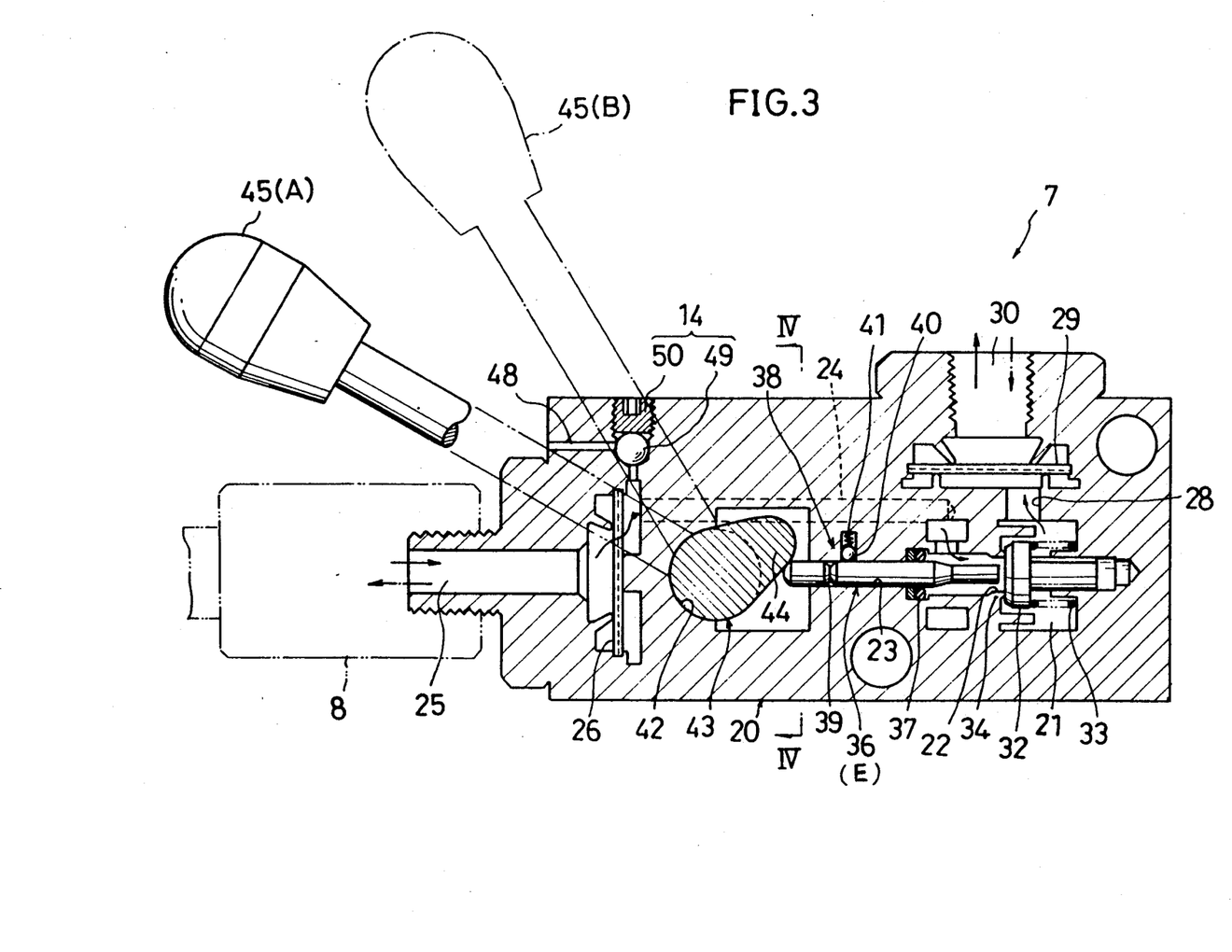
FIG. 3 is a vertical sectional view of the check valve.

As shown in FIG. 3, a check valve chamber 21 is formed in the right side portion of the valve box 20, an inlet port 22 is formed in the left end surface (one end surface) of the check valve chamber 21, and the inlet port 22 is communicated with a pressure supply port 25 through a communication passage 24. The aforementioned quick coupling 8 is attached to a peripheral wall of the pressure supply port 25, and an inlet filter 26 is arranged in the downstream side of the pressure supply port 25. An outlet port 28 is opened in a peripheral surface of the inner surfaces of the check valve chamber 21, which is another surface besides the surface where the inlet port 22 is formed. The outlet port 28 is communicated with a working port 30 through an outlet filter 29. The working port 30 is connected to the clamp actuating oil chamber 4a of the hydraulic clamp 4.

A check valve member 32 is inserted into the check valve chamber 21, and the check valve member 32 is resiliently urged by means of a check spring 33 to a check valve seat 34 formed in the peripheral wall of the inlet port 22 for valve closing.

A valve opening member insertion port 23 is disposed nearly coaxially and in series with respect to the check valve chamber 21 and the inlet port 22. A valve opening member 36 is oil-tightly and slidably inserted into the valve opening member insertion body through a sealing member 37.

The valve opening member 36 is adapted to be movably changed over between a valve opening position F where the valve opening member 36 is advanced toward the check valve chamber 21 on the right side for opening the check valve member 32 and a valve opening cancellation position E where the valve opening member 36 is retreated leftward outside the inlet port 22 from the check valve chamber 21 (refer to FIG. 1), and is so disposed that the right end portion (fore end portion) of the valve opening member 36 faces the check valve member 32 from the side of the inlet port 22 and the left end portion (back end portion) thereof faces the actuation portion 44 of the actuator shaft 43.

The actuator shaft 43 is rotatably supported by means of an actuator shaft supporting port 42 laterally passing through the valve box 20 and is connected at its one end to the base portion of a manipulation lever 45 so as to be turned in the same direction as that of the manipulation lever 45.

Figure 1A:
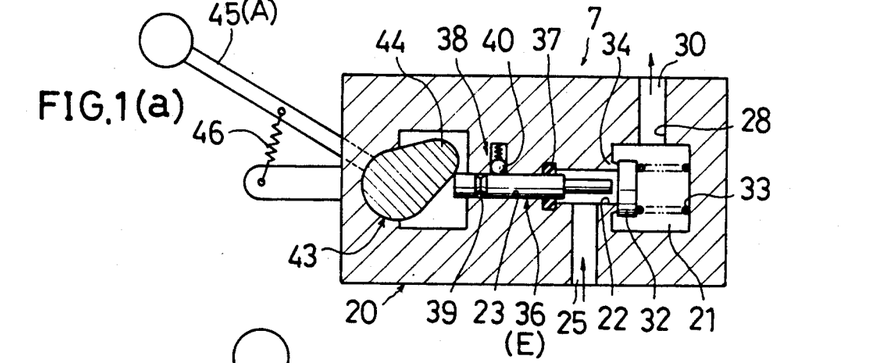
FIG. 1(a) is a view showing a valve opening cancellation condition.
Figure 1B:
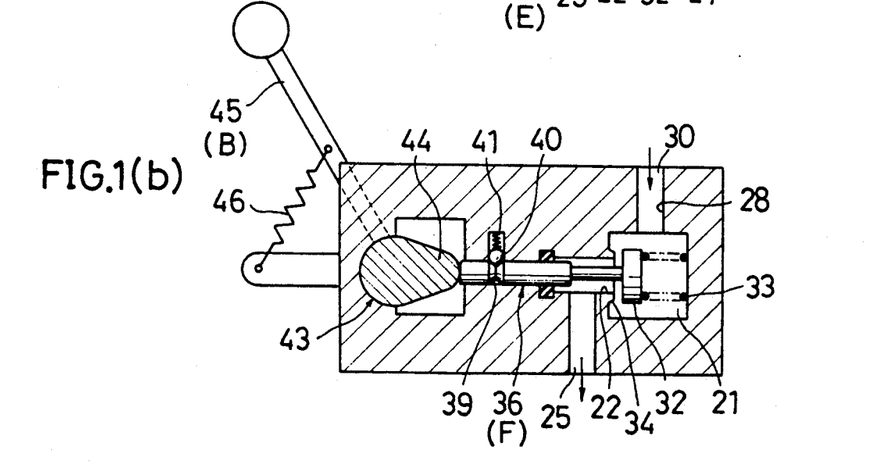
FIG. 1(b) is a view showing a valve opening operation condition.
Figure 1C:
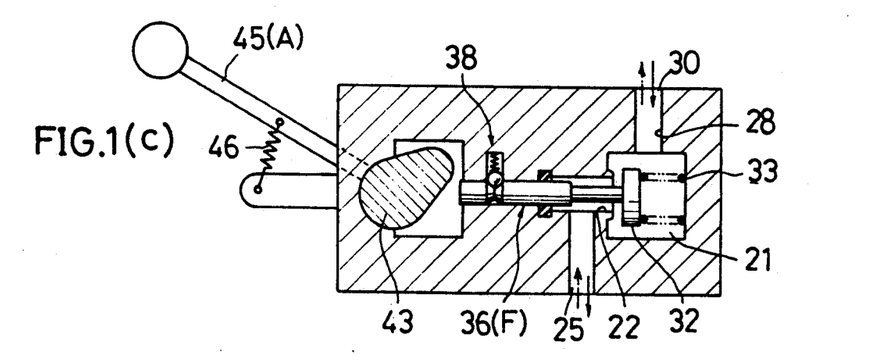
FIG. 1(c) is a view showing a valve opened state holding condition.

The manipulation lever 45 is adapted to be changed over between a valve opening posture B (refer to FIG. 1(b)) where it changes over the valve opening member 36 to the valve opening position F through the actuator shaft 43 and the valve opening cancellation posture A (refer to FIGS. 1(a) and 1(c)) where it allows the valve opening member 36 to be changed over from the valve opening position F to the valve opening cancellation position E.

In the above-mentioned construction, a valve opened state holding means 38 is arranged in both the valve opening member insertion port 23 of the valve box 20 and the valve opening member 36. The valve opened state holding means 38 comprises a V-shaped groove 39 formed in the left portion of the valve opening member 36 and a steel ball 40 inserted in the peripheral wall of the valve opening member insertion port 23 and adapted to be urged by means of a spring 41 as to be engaged with the V-shaped groove 39.

Figure 4:
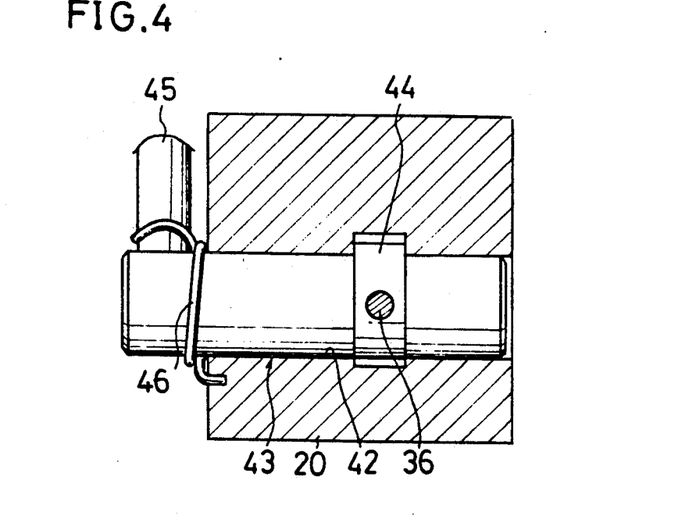
FIG. 4 is a sectional view taken along the IV—IV directed line in FIG. 3.

As shown in FIG. 4, in the portion between the manipulation lever 45 and the valve box 20 in the manipulation force transmitting system from the manipulation lever 45 to the valve box 20 through the actuator shaft 43 there is provided a manipulation lever returning spring 46 comprising a torsion coil spring. This returning spring 46 has a resilient force set to allow the manipulation lever 45 to be changed over from the valve opening cancellation posture A to the valve opening posture B as well as to automatically return the manipulation lever 45 from the valve opening posture B to the valve opening cancellation posture A.

Incidentally, as shown in FIG. 3, the aforementioned pressure removal valve 14 comprises a ball valve member 39 adapted to be brought into valve closing contact with a midway portion of a pressure removal passage 48 communicated with the pressure supply port 25, by means of an opening and closing manipulation screw 50.

As shown in FIG. 1, the aforementioned check valve 7 with the valve opening device operates as follows.

When the work 3 is clamped, as shown in FIG. 1(a), the manipulation lever 45 is changed over to the valve opening cancellation posture A so that the valve opening member 36 is changed over to the valve opening cancellation position E. Thereupon, the check valve member 32 is separated from the check valve seat 34 by means of the pressurized oil supplied into the inlet port 22 from the pressure supply port 25. Subsequently, the pressurized oil is supplied to the working port 30 from the check valve chamber 21 through the outlet port 28. Thereupon, the cylinder of the aforementioned hydraulic clamp 4 is extended. When the hydraulic pressures within the clamp actuating oil chamber 4a and the check valve chamber 21 are increased to the predetermined pressure, the check valve member 32 is brought into contact with the check valve seat 34 for valve closing by means of the resilient force of the check spring 33 so as to perform the checking function.

When the work 3 is unclamped, as shown in FIG. 1(b), the manipulation lever 45 is changed over to the valve opening posture B by an operator. Thereupon, the valve opening member 36 is changed over to the valve opening position F on the right side by means of the manipulation force through the actuator shaft 43 so that the check valve member 32 is forcedly separated from the check valve seat 34 by overcoming the inner pressure of the check valve chamber 21. Thereby, the pressurized oil within the clamp actuating oil chamber 4a starts to be discharged from the pressure supply port 25 through the outlet port 28, the check valve chamber 21 and the outlet port 22 in order after delivery from the working port 30, and the hydraulic pressure within the inlet port 22 quickly decreases. Under this condition, the steel ball 40 is engaged with the V-shaped groove 39 of the valve opening member 36 to hold the valve opening member 36 at the valve opening position F.

Thereby, as shown in FIG. 1(c), though the operator removes hands from the manipulation lever 45 so that the manipulation lever 45 is returned to the valve opening cancellation posture A by means of the resilient force of the manipulation lever returning spring 46, the check valve member 32 is held in the valve opened state by means of the valve opening member 36 and the pressurized oil within the clamp actuating oil chamber 4a is allowed to be continuously discharged.

When a new work 3 is clamped, as shown in FIG. 1(c), the pressurized oil is supplied to the inlet port 22 (refer to the alternate long and short dash directed line) under the condition in which the valve opening member 36 is held at the valve opening position F by means of the valve opened state holding means 38. Thereupon, as shown in FIG. 1(a), the valve opening member 36 is pushed toward the actuator shaft 43 on the left side by means of the supplied hydraulic pressure against the holding resistance at the valve opened state holding means 38 and the sliding resistance at the sealing member 37 to be automatically returned from the valve opening position F to the valve opening cancellation position E. Thereby, the checking function of the check valve member 32 is reliably performed.

As mentioned above, when the valve opening member 36 is changed over from the valve opening position F to the valve opening cancellation position E by means of the pressure in the inlet port 22, the changeover resistance acting on the valve opening member 36 can be only two resistances, namely the sliding resistance at the sealing member 37 of the valve opening member 36 and the lock cancellation resistance at the valve opened state holding means 38. Accordingly, according to the present invention, the sliding resistance at the contact portion between the actuation portion 144 of the actuator shaft 143 and the valve opening member 136 and the turning resistance at the actuator shaft 143 in the conventional embodiment (refer to FIGS. 11 and 12) can be omitted. Therefore, the changeover resistance acting on the valve opening member 36 becomes smaller, and it becomes possible to employ the check valve 7 with the valve opening device for a wide utilization from a low pressure to a high pressure.

Since the sealing portion of the aforementioned valve opening member 36 is sufficiently lubricated with a pressurized oil so that rusts are hardly produced thereon and also intrusions of foreign substances are hardly caused, the sliding resistance becomes stable. Therefore, when the valve opening member 36 is changed over from the valve opening position F to the valve opening cancellation position E, also the pressure in the inlet port 22 is stabilized.

Further, since the manipulation lever 45 is automatically returned by means of the resilient force of the return spring 46 from the valve opening posture B to the valve opening cancellation posture A before the valve opening member 36 is changed over from the valve opening position F to the valve opening cancellation position E, it becomes possible to prevent a sudden changeover.

Incidentally, the manipulation layer return spring 46 may be of the other type such as a tension spring and the like instead of the torsion coil spring.

Further, the return spring 46 may be disposed between the valve box 20 and the actuator shaft 43 instead of between the valve box 20 and the manipulation lever 45.

FIGS. 5 through 10 illustrate a second embodiment through a fourth embodiment. In the respective embodiments, component parts having the same functions as those in the first embodiment are indicated by the same symbols.

Second Embodiment

Figure 5:
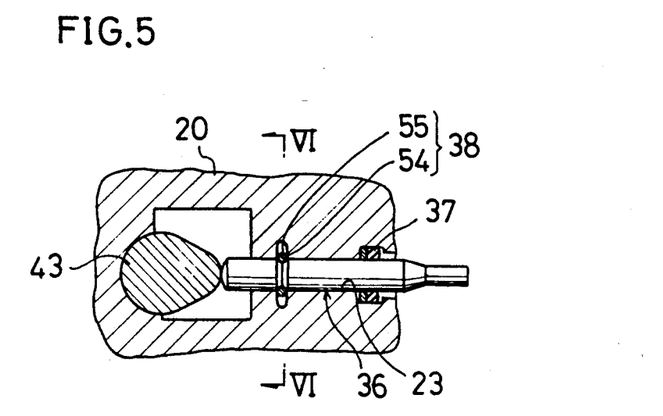
FIG. 5 is a partial view corresponding to FIG. 3.
Figure 6:
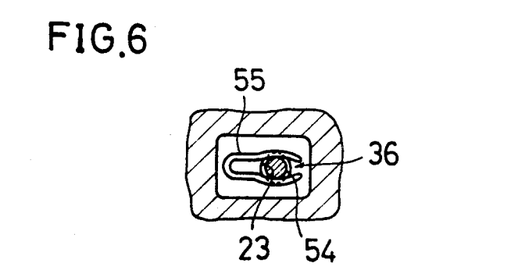
FIG. 6 is a sectional view taken along the VI—VI directed line in FIG. 5.

FIGS. 5 and 6 show the second embodiment.
In this case, the valve opened state holding means 38 comprises a V-shaped groove 54 formed in the valve opening member 36 and a U-shaped spring 55 inserted in the peripheral wall of the valve opening member insertion port 23.

Third Embodiment

Figure 7:
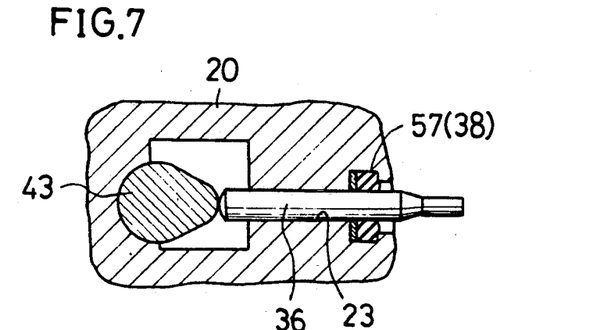
FIG. 7 shows a third embodiment thereof and is a view corresponding to FIG. 5.

FIG. 7 shows the third embodiment.
In this case, the valve opened state holding means 38 comprises a sealing member 57 of the valve opening member 36 to hold the valve opening member 36 at the valve opened state only by means of a sliding resistance at the sealing member 57.

Fourth Embodiment

Figure 8:
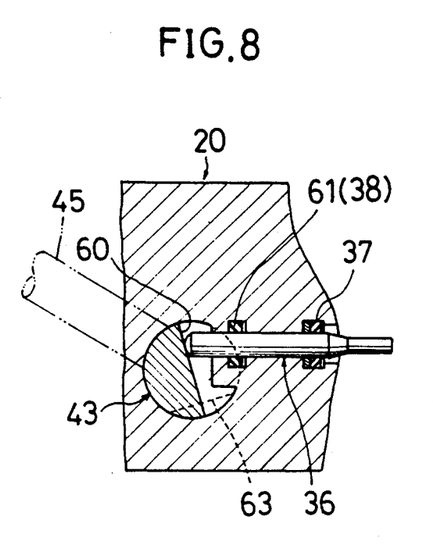
FIG. 8 is a partial view corresponding to FIG. 3.
Figure 9:
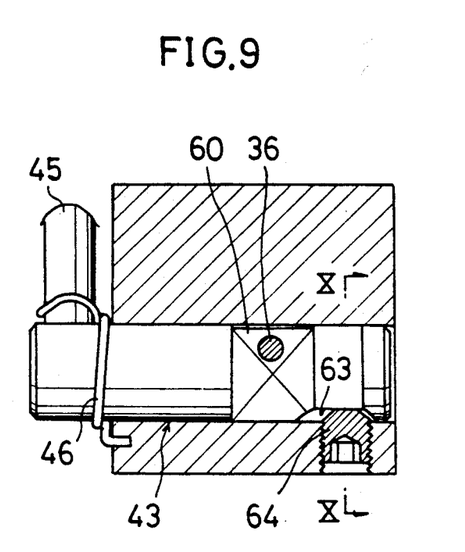
FIG. 9 is a vertical sectional right side view in FIG. 8.
Figure 10:
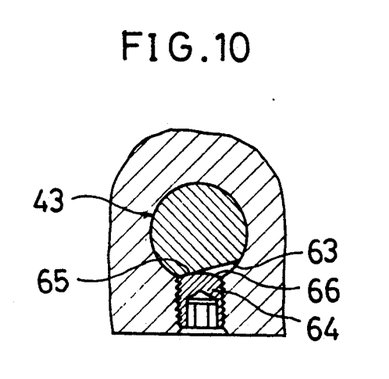
FIG. 10 is a sectional view taken along the X—X directed line in FIG. 9.

FIGS. 8 through 10 show the fourth embodiment.
The axis of the actuator shaft 43 is displaced below the axis of the valve opening member 36, so that the back end portion of the valve opening member 36 faces the upper portion of an eccentric actuation surface 60 as the actuation portion of the actuator shaft 43.

The valve opened state holding means 38 comprises a resilient member 61 provided separately from the sealing member 37.

Further, a turning restraining stopper surface 63 for the manipulation lever 45 is formed in one of the opposite side portions of the actuator shaft 43 opposed to the manipulation lever 45. A stopper screw 64 is provided with two receiving surfaces 65, 66 so as to oppose to the stopper surface 63.

As many different embodiments of the invention will be obvious to those skilled in the art, some of which have been disclosed or referred to herein, it is to be understood that the specific embodiments of the present invention as presented herein are intended to be by way of illustration only and are not limiting on the present invention, and it is to be understood that such embodiments, changes, or modifications may be made without departing from the spirit and scope of the present invention as set forth in the claims appended hereto.

What is claimed is:

1. In a check valve with a valve opening device, including
   a valve box (20) having a check valve chamber (21), an inlet port (22) of said check valve chamber (21) and a valve opening member insertion port (23) formed in series therein,
   a check valve member (32) inserted into said check valve chamber (21) and resiliently urged for valve closing toward said inlet port (22) by means of a check spring (33), a valve opening member (36) having a front end portion facing said check valve member (32) and a back end portion facing an actuator shaft (43), being oil-tightly inserted into said valve opening member insertion port (23) so as to be slidably in the fore and back direction, and being adapted to be changed over between a valve opening position (F) on the fore side and a valve opening cancellation position (E) on the back side, a manipulation lever (45) adapted to turn said actuator shaft (43) as well as to be manipulated for changeover between a valve opening posture (B) for changing over said valve opening member (36) to said valve opening position (F) and a valve opening cancellation posture (A) for allowing said valve opening member (36) to be changed over from said valve opening position (F) to said valve opening cancellation position (E) by means of a hydraulic pressure in said inlet port (22), and a valve opened state holding means (38) holding said valve opening member (36) at the valve opening position (F), the improvement comprising:

said valve opened state holding means (38) being arranged in both the valve opening member (36) and the valve box (20), a manipulation lever return spring (46) being disposed in a manipulation force transmitting system from the manipulation lever (45) to the valve box (20) through the actuator shaft (43), and said manipulation lever return spring (46) being adapted to allow the manipulation lever (45) to be changed over from the valve opening cancellation posture (A) to the valve opening posture (B) as well as to automatically return the manipulation lever (45) from the valve opening posture (B) to the valve opening cancellation posture (A).

2. A check valve according to claim 1, wherein said valve opened state holding means (38) is arranged between the valve opening member insertion port (23) of the valve box (20) and the valve opening member (36).

3. A check valve according to claim 1, wherein said manipulation lever return spring (46) is disposed between the valve box (20) and the manipulation lever (45).

4. A check valve according to claim 2, wherein said manipulation lever return spring (46) comprises a torsion coil spring.

5. A check valve according to claim 1, wherein said check valve chamber (21) is communicated with a driving oil chamber (4a) of a single acting spring return type hydraulic cylinder.

* * * * *